Sept. 30, 1930.  R. S. SANFORD  1,776,954
BRAKE MECHANISM
Filed Nov. 15, 1926
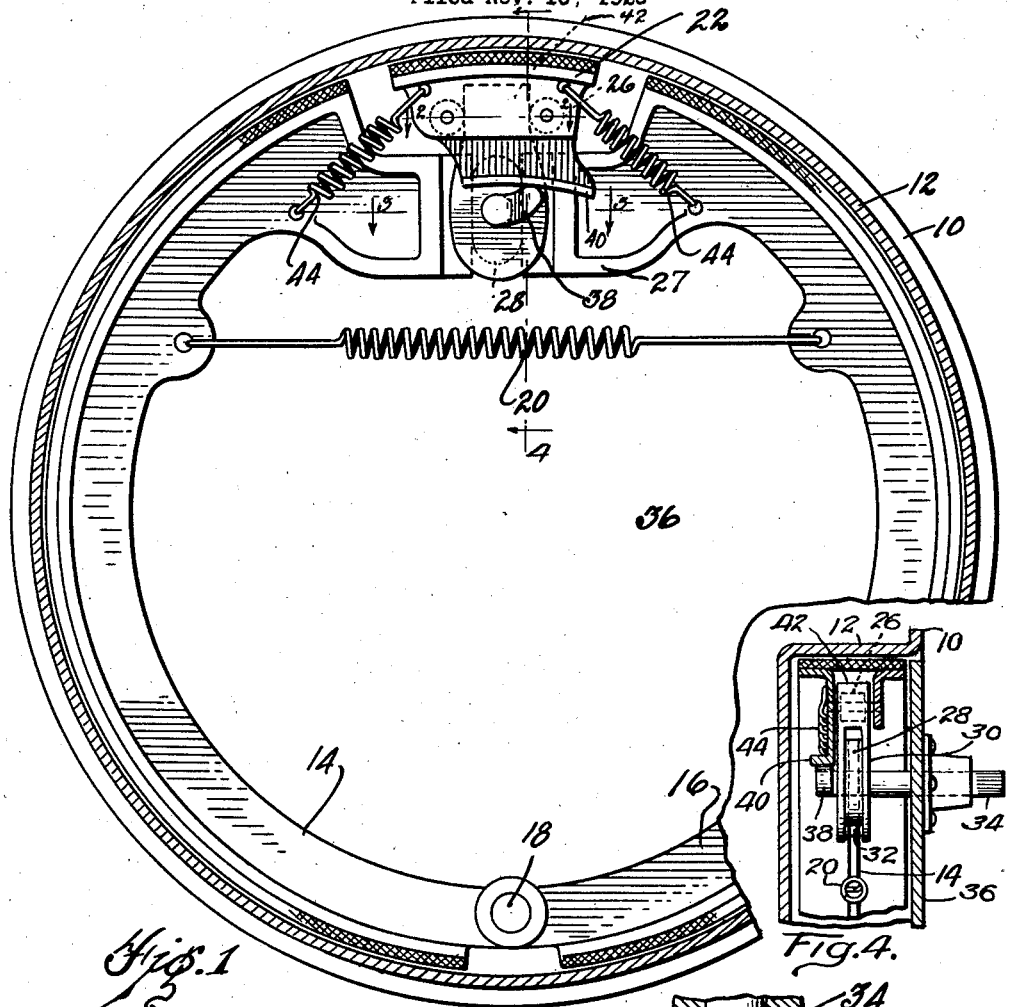
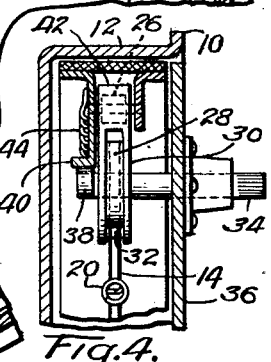
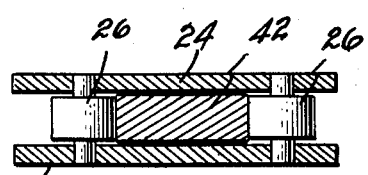
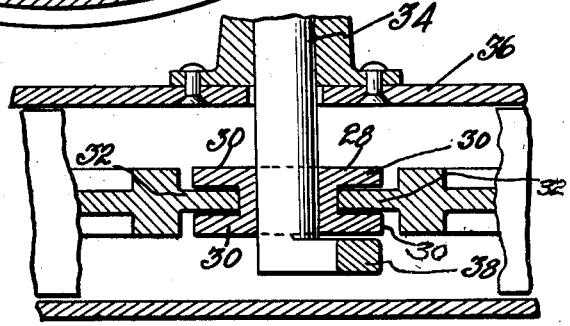
INVENTOR.
Roy S. Sanford
BY
Burton & McConkey,
ATTORNEYS.

Patented Sept. 30, 1930

1,776,954

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE MECHANISM

Application filed November 15, 1926. Serial No. 148,373.

My invention relates to improvements in brakes and operating mechanism for actuating the same and particularly concerns itself with brakes as applied to the traction wheels of power driven road vehicles.

An object is to provide simple, efficient brake operating mechanism adapted to be actuated by the driver of the vehicle and provided with an improved servo device and improved connections therefor. More specifically an object is to provide in brake mechanism having a servo brake member improved means for actuating the servo member and for transmitting power therefrom to the co-operating brake member to apply the braking resistance to a brake drum. The various detail features of my improvement and its meritorious advantages will more fully appear from the following description of the illustrative embodiment shown in the accompanying drawing and defined in the claims.

In the drawings:

Fig. 1 is a vertical sectional view through a brake drum provided with my improvement.

Fig. 2 is a cross-sectional view taken on line 2—2 of Fig. 1.

Fig. 3 is a cross-sectional view taken on line 3—3 of Fig. 1.

Fig. 4 is a cross-sectional view taken on line 4—4 of Fig. 1.

In the drawing I have indicated the usual brake drum as 10. This has a frictional surface 12. A pair of brake shoes 14 and 16 are pivotally anchored at 18 within the drum upon a pivot carried by the backing plate. These shoes are held away from the drum by a spring 20. A servo shoe 22 is positioned between the separated opposed ends of the anchored shoes and engages the same surface of the drum. These shoes may be provided with frictional facings as shown. The servo shoe is provided with a pair of axially spaced radial flanges 24. A pair of circumferentially spaced rollers 26 are journalled between the flanges 24.

The anchored shoes are provided with inturned separated opposed end portions 27. Between these opposed end portions is located a large cam 28 which cam is adapted to move the shoes into engagement with the drum. This cam and the adjacent end portions 27 of the shoes are provided with abutting interlocking parts 30 and 32 adapted to hold the respective members in relative lateral alignment.

An operating shaft 34 suitably mounted for rockable movement is journalled within the backing plate 36. This shaft carries a small cam 38 which cam is adapted to engage the arcuate face 40 of the auxiliary shoe 22 to move said shoe radially into engagement with the drum.

The large cam 28 is rotatably mounted upon the shaft 34 adjacent the cam 38. The cam 28 has a portion 42 which projects toward the servo shoe and between its radial flanges 24 and between the rollers 26, so that movement of the auxiliary shoe rotatably with the drum causes one of the rollers to swing the cam 28 to move the shoes 14 and 16 against the drum. The shoe 22 is normally held away from the drum by springs 44.

What I claim is:

1. In a road vehicle having a traction wheel, a brake for the wheel comprising a drum, a pair of brake shoes arranged with respect to the drum to be moved thereagainst, a servo shoe positioned between the separated ends of the first mentioned shoes, a cam adapted to be actuated to move the servo shoe against the drum and a second cam pivoted upon the first cam and coupled with the servo shoe to be actuated thereby to move the first mentioned shoes against the drum.

2. In brake mechanism, a brake drum, a pair of brake shoes pivotally anchored within the drum, a servo shoe positioned between the separated ends of the first mentioned shoes, a rockably supported actuating member operable to actuate the servo shoe into engagement with the drum, a second rockable member pivotally mounted upon the first member and coupled with the auxiliary shoe to be actuated thereby to move the first mentioned shoes into engagement with the drum.

3. In brake mechanism, a brake drum, a pair of brake shoes arranged within the drum, a servo shoe interposed between the separated ends of the first mentioned shoes, a rockably supported shaft having a part adapted to move the servo shoe into engagement with the drum, a cam pivotally mounted upon the shaft and coupled with the servo shoe to be actuated thereby to move the first mentioned shoes against the drum.

4. In brake mechanism, a brake drum, retarding means having separated ends arranged within the drum, a servo shoe interposed between the separated ends of the retarding means, a rotatable part operable to actuate the servo shoe to engage the drum, a second rotatable part supported upon the first part coupled with the servo shoe to be actuated thereby to move said retarding means against the drum.

5. In brake mechanism, a brake drum, a pair of brake shoes arranged within the drum, a servo shoe interposed between the separated ends of said pair of shoes, a rockably supported shaft provided with a cam adapted to bear against an inner arcuate face formed on the servo shoe to move the shoe against the drum, a substantially larger cam pivotally mounted upon said shaft alongside the first cam, means on the servo shoe engaging the second cam to rock the same upon said shaft as the servo shoe is actuated rotatably with the drum, said second cam so arranged with respect to said pair of shoes as to move the same against the drum upon its being actuated by the servo shoe.

6. In brake mechanism, a brake drum, a pair of brake shoes pivotally arranged within the drum to be actuated to apply a braking force thereto, a servo shoe positioned between the separated ends of the first mentioned shoes to engage the same surface of the drum, springs to hold said shoes away from the drum, a shaft journalled in a fixed support and provided with a cam adapted to engage the servo shoe to move it against the drum, a second cam pivotally mounted upon said shaft between opposed end portions of the first mentioned shoes, rollers upon the servo shoe, one on each side of the second cam, adapted to rock the cam upon the shaft upon actuation rotatably of the servo shoe by the drum.

7. In brake mechanism, a brake drum, a plurality of brake shoes pivotally arranged within the drum to be actuated to apply a braking force thereto, a servo shoe positioned between the separated ends of two of said first mentioned shoes adapted to engage the same surface of the drum, springs to urge said shoes away from the drum, a shaft journalled in a fixed support and extending between the opposed separated end portions of said shoes, a cam on said shaft adapted to engage the servo shoe to move the same against the drum, a second cam freely, pivotally mounted upon said shaft and having a portion interlocking with parts of the end portions of said two shoes to be held in alignment therewith and having a portion projecting toward the servo shoe to be actuated thereby upon movement of the servo shoe rotatably with the drum to oscillate the cam to move said two shoes against the drum.

8. In brake mechanism, a brake drum, a plurality of brake shoes pivotally anchored within the drum, a servo shoe positioned between the separated ends of two of said shoes, means holding said shoes yieldingly away from the drum, a shaft journalled in a fixed support, a cam on said shaft engaging the servo shoe to move the same against the drum upon rotation of the shaft, a second cam freely, pivotally mounted upon said shaft, said second cam and adjacent end portions of the primary shoes provided with abutting radial flanges adapted to prevent relative axial displacement of the cam and shoes, said servo shoe provided with spaced radial flanges, said second cam provided with a portion extending between the radial flanges of the servo shoe, rollers positioned between the flanges of the servo shoe, one on each side of said second cam portion and adapted to engage the same to swing the cam upon movement of the shoe rotatably with the drum, whereby the cam actuates the anchored shoes to engage the drum.

9. In brake mechanism, a brake drum, a pair of brake shoes provided with opposed separated end portions arranged within the drum, a servo shoe arranged between the opposed separated ends of said pair of shoes, said pair of shoes provided at said opposed ends with corresponding portions inturned over said servo shoe, said servo shoe provided with laterally spaced radial flanges and circumferentially spaced rollers carried by said flanges, a shaft journalled in a fixed support and provided with a cam positioned between the inturned ends of said pair of shoes and adapted upon rotation of the shaft to actuate the servo shoe into engagement with the drum, a second cam rotatably mounted upon said shaft alongside the first cam and having a part extending between the radial flanges of the servo shoe and the rollers carried thereby adapted to be actuated to urge said pair of shoes into engagement with the drum, and means normally yieldingly holding said shoes away from the drum.

10. Brake mechanism comprising, in combination, a rotatable drum, retarding means having separated ends arranged to engage the drum, a servo shoe positioned between the separated ends of the retarding means, a rotatably supported shaft provided with a cam adapted to force the servo shoe into engagement with the drum, a second cam rotatably supported upon said shaft and coupled with the servo shoe to be actuated thereby to force the retarding means into engagement with the drum.

11. Brake mechanism comprising, in combination, a rotatable drum, retarding means engageable therewith and having ends separated by an interval, a servo shoe positioned within said interval and adapted to be brought into engagement with the drum, a pair of cams supported upon a common axis, one cam adapted to be actuated to move the servo shoe into engagement with the drum and the other cam responsive to the movement of the servo shoe to move the retarding means into engagement with the drum.

12. Brake mechanism comprising, in combination, a rotatable drum, retarding means engageable therewith and having ends separated by an interval, a servo shoe positioned within said interval and adapted to be brought into engagement with the drum, a small cam and a large cam arranged upon the same shaft, said small cam rotatable with the shaft to move the servo shoe against the drum, said large cam rotatable upon the shaft in response to the movement of the servo shoe to move the retarding means against the drum.

13. Brake mechanism comprising, in combination, a rotatable drum, retarding means arranged to engage the drum and having ends separated by an interval, a servo shoe arranged within said interval, said retarding means having opposed end portions overlapping the servo shoe, a shaft rotatably supported between said opposed end portions, a cam on the shaft rotatable therewith to move the servo shoe into engagement with the drum, and a second cam on the shaft rotatable thereover to engage the opposed ends of the retarding means to move said means into engagement with the drum.

14. Brake mechanism having, in combination, a rotatable drum, a plurality of retarding members arranged end to end therein, a rotatably supported shaft provided with one cam adapted to engage one retarding member to force it against the drum and provided with a second cam adapted to be actuated by the first retarding member to force the second retarding member against the drum.

15. Brake mechanism comprising, in combination, a rotatable drum, a plurality of retarding devices arranged to engage the drum, a rotatably supported shaft provided with a pair of cams one of which is so mounted upon the shaft as to be actuated thereby to force one retarding device into engagement with the drum and the other cam is so coupled with said retarding device as to be actuated over the shaft to force the second retarding device into engagement with the drum.

16. Brake mechanism comprising, in combination, a rotatable member, a plurality of retarding devices operable to be moved into engagement therewith, a pair of applying parts supported for rotation about a common axis one of said parts operable to urge one of said retarding devices into engagement with the rotatable member and the other part coupled with said first-mentioned retarding devices to be actuated thereby to urge the other retarding devices into engagement with the rotatable member.

17. Brake mechanism comprising, in combination, a rotatable member, a plurality of retarding devices operable to be moved into engagement therewith, a pair of juxtaposed cams arranged for relatively independent rotation about a common axis, one of said cams operable to urge one of said retarding devices into engagement with the rotatable member and the other cam coupled with said retarding devices to be actuated thereby to urge the other retarding devices into engagement with the rotatable member.

18. Brake mechanism comprising, in combination, a rotatable member, a plurality of retarding devices operable to be moved into engagement therewith, a pair of cams of dissimilar size arranged for relatively independent rotation about a common axis, one of said cams arranged to urge one of said devices into engagement with the rotatable member and the other cam arranged to urge the other retarding devices into engagement with the rotatable member and adapted to be acted upon with a servo action by the first-mentioned retarding devices.

19. Brake mechanism comprising, in combination, a rotatable drum, retarding means arranged within the drum to be urged thereagainst, a servo member within the drum to be urged thereagainst to rotate therewith, a pair of cams arranged coaxially within the drum for relatively independent rotation, one of said cams adapted to urge the servo member into engagement with the drum and the second cam adapted to be acted upon by the servo member to urge the retarding means into engagement with the drum.

20. Brake mechanism comprising, in combination, a rotatable drum, retarding means arranged therein to be urged thereagainst, a servo member arranged therein to be urged thereagainst to rotate therewith, a pivotally supported camshaft having a cam adapted to urge the servo member against the drum, a second cam rotatably supported upon said shaft adapted to be actuated upon by said servo member to urge the retarding means against the drum.

In testimony whereof, I, ROY S. SANFORD, sign this specification.

ROY S. SANFORD.